Nov. 2, 1926.
W. E. MOREY
DUMP CAR CONSTRUCTION
Filed August 23, 1922
1,605,267
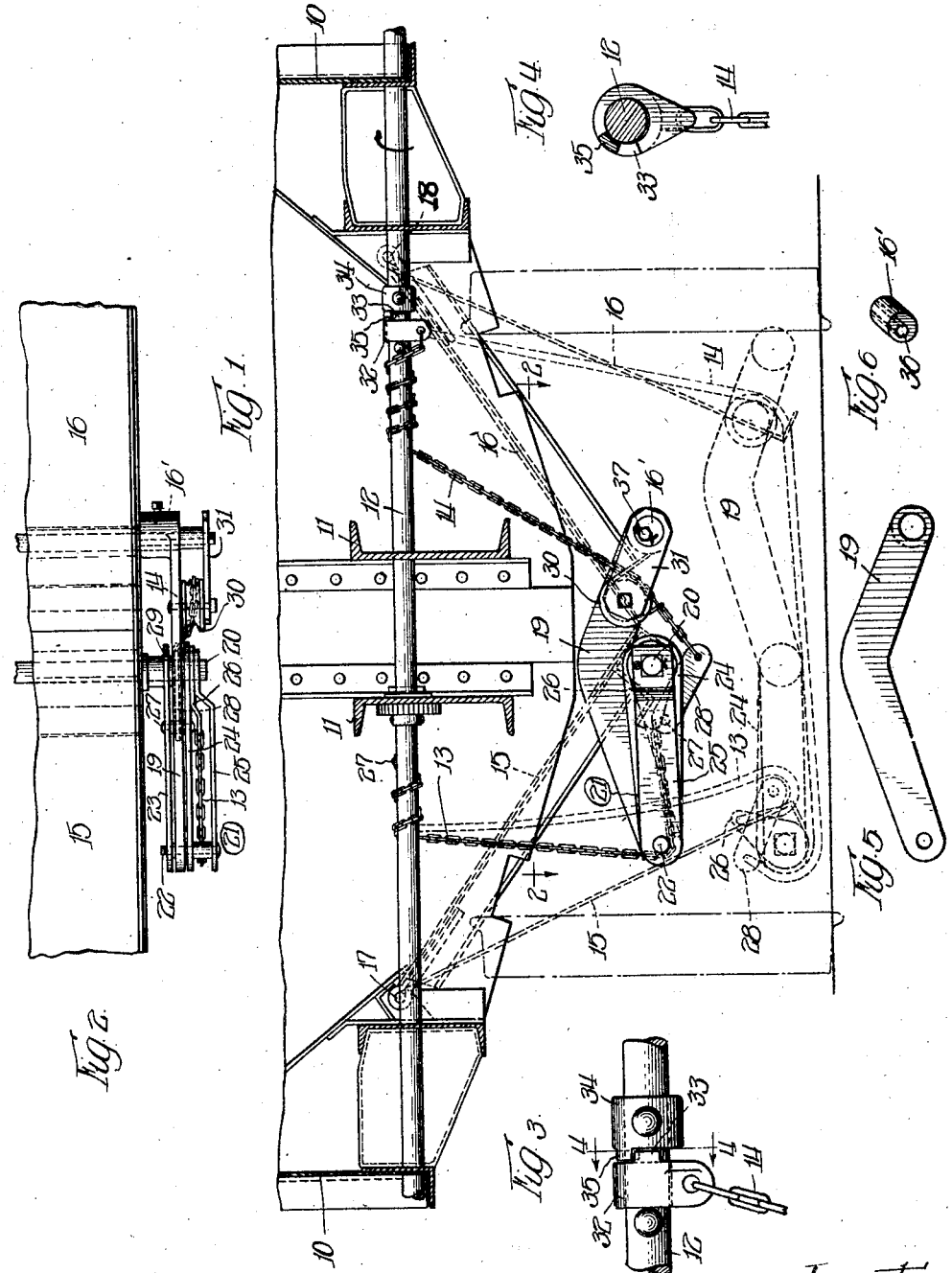

Patented Nov. 2, 1926.

1,605,267

UNITED STATES PATENT OFFICE.

WILLIAM E. MOREY, OF CHICAGO, ILLINOIS, ASSIGNOR TO NATIONAL DUMP CAR CO., OF CHICAGO, ILLINOIS, A CORPORATION OF MAINE.

DUMP-CAR CONSTRUCTION.

Application filed August 23, 1922. Serial No. 583,700.

The present invention relates to dump car construction.

In certain common types of dump car, the dump doors are designed to open suddenly upon the releasing of certain mechanism. In dump cars of this type accidents are likely to happen if all the parts, including the operating chains, are not of exactly the proper dimensions.

An object of the present invention is to provide dumping mechanism for dump cars providing greater safety for the operators.

A further object is to provide operating mechanism for dump cars of the type which opens practically instantaneously, said mechanism including means for ensuring the safety of the operator.

Further objects will appear as the description proceeds.

Referring to the drawings—

Figure 1 is a sectional view taken transversely of a dump car of the center dumping type;

Figure 2 is a fragmentary view taken in the direction indicated by the arrows 2—2 of Figure 1;

Figure 3 is a view in side elevation, on an enlarged scale, illustrating a safety device;

Figure 4 is a sectional view taken along the line 4—4 of Figure 3; and

Figures 5 and 6 illustrate details of construction.

The numerals 10—10 indicate the sides of a car, while the numerals 11—11 indicate the center sills of said car. Mounted transversely of the car is the operating shaft 12, which carries two chains 13 and 14 for operating the hopper doors 15 and 16. The hopper doors 15 and 16 are pivoted along the longitudinal axes 17 and 18 respectively, said doors being shown in full and dotted lines in closed position and in dotted lines in open position.

Pivotally connected to the door 16, by means of the pivot pin 16' located in an axis distant from pivotal axis 18, is the link 19, which may take the angular form shown in the drawing for a purpose to be referred to hereinafter. Pivotally connected to the door 15 on the shaft 20, located in an axis distant from pivotal axis 17, is the crank 21, which crank is pivotally connected to the link 19 by means of the pivot pin 22. Said crank 21 may consist of the three parallel plates 23, 24 and 25. The link 19 may be connected to the pivot pin 22 between the plates 23 and 24. Mounted on the shaft pin 20 in the space between plates 24 and 25 is the eye member 26, to which is connected one end of the chain 13. The other end of said chain 13 is fixedly connected to the shaft 12 at the point 27. Said chain 13 underlies the pivot pin 22 which connects the link 19 with crank 21, and said chain, upon being wound up upon the shaft 12, is adapted to raise the pivot pin 22, for a purpose to be referred to hereinafter.

Connected to the crank 21 at a point adjacent to the pivot pin 20, is the link 28, which constitutes part of the chain 14. In part of its travel, the chain 14 raises the pivot pin 20, and for this reason said pivot pin may be provided with a flanged sheave portion 29 for engaging chain 14. The link 19 is provided with the sheave 30, which sheave engages with chain 14. A guard plate 31 may be provided to keep the chain 14 in operative relationship with the sheave 30.

It has been stated that one end of the chain 14 will be connected through the link 28 to the crank 21. The other end of said chain 14 is connected to the collar 32, which is loosely mounted on the shaft 12. Said collar 32 is provided with a lug 33 extending longitudinally with reference to the shaft 12. Fixedly mounted on said shaft 12 is the collar 34 provided with the lug 35 adapted to engage with the lug 33 of collar 32 when the shaft 12 is turned in one direction. The lugs 33 and 35 should be designed, however, to permit a considerable amount of lost motion. According to the illustration, the collar 34 is permitted almost a complete revolution in one direction from engagement with one side of lug 33 before engaging with the other side of lug 33. Any preferred type of lost motion device may be used whereby the desired amount of lost motion may be provided.

The parts are so designed that when the dump doors 15 and 16 are in closed position the chain 14 will have a greater number of convolutions upon said shaft than has chain 13. According to the drawings, chain 13 has two convolutions upon shaft 12, while chain 14 has four convolutions upon said shaft. In the condition referred to, that is, with the doors closed, the link 19 will rest upon the crank 21, and the pivot pin 22, which pivotally connects link 19 and crank 21, will lie in a position past dead center, whereby stresses applied to the doors 15 and 16 to urge same to open position will react upon link 19 and crank 21 to force pivot pins 16′ and 20 toward one another whereby to hold said doors 15 and 16 in closed position. As will be referred to hereinafter, when the pivot pin 22 is raised past dead center with reference to pivot pins 20 and 16′, the doors 15 and 16 will fly open, resulting in the practically instantaneous dumping of the car.

For securing adjustment of doors 15 and 16, a construction is provided which will now be described. It sometimes happens in the course of the manufacture of the cars or after the cars have been subjected to stresses in service that the doors 15 and 16 do not properly close. For procuring adjustment, the pivot pin 16′ is eccentrically mounted. Said pivot pin 16′ may consist of a cylinder provided with a hole extending longitudinally thereof, which hole (indicated in Figure 6 by the numeral 36) is eccentric relative to the axis of pin 16′ and is shown as being hexagonal in contour. The pivot pin 16′ is adapted to fit over a hexagonal projection 37 on the door 16. It will be clear without detailed explanation that adjustability between the centers of pivot pin 16′ and pivot pin 20 may be had by changing the angular adjustment of pivot pin 16′ relative to the hexagonal pin 37. For this purpose it is only necessary to remove the pivot pin 16′ from the hexagonal pin 37 and replace said pivot pin 16′ in a different angular position. By this expedient, less refinement in manufacture is required and delays and expense due to repairs on the road are avoided.

With the doors in closed position, as indicated in Figure 1, releasing may be accomplished by turning the shaft 12 in the direction indicated by the arrow. Such motion will result in the unwrapping of chains 13 and 14 from the shaft 12. The weight of chain 14 will cause the collar 32, which is loose on shaft 12, to revolve as the shaft 12 revolves, whereby lug 33 of collar 32 will follow lug 35 of collar 34, which collar 34 is fast on shaft 12. After the chain 13 has been completely unwrapped from shaft 12, further revolution of shaft 12 in the direction indicated by the arrow will cause the chain 13 to again wrap itself upon shaft 12 but in the reverse direction from that indicated in the drawing. The wrapping up of chain 13 on shaft 12 will finally cause chain 13 to engage with the pivot pin 22, raising said pivot pin to a position past dead center. At this time the chain 14 will have become practically unwrapped from the shaft 12. The raising of pivot pin 22 above its dead center will cause the doors 15 and 16 to fly open, resulting in the instantaneous dumping of the car. Inasmuch as chain 14 has become practically unwrapped from shaft 12, there should be no turning movement exerted upon shaft 12 by this sudden opening of the doors 15 and 16. It frequently happens in service, however, that the chain 14 is not of exactly the proper length to reach its completely unwound state at the instant of dumping, and if chain 14 were fast to shaft 12, a sudden violent turning movement might be applied to shaft 12, resulting in injury to the operator. According to the present invention, however, wherein a large amount of lost motion is provided between lug 33 of loose collar 32 and lug 35 of tight collar 34, any sudden jerk upon the chain 14 will merely result in the pulling away of lug 33 from lug 35, whereby said jerk will not be communicated to shaft 12.

It will be understood that various modifications of the lost motion connection between said shaft 12 and chain 14 may be provided. Other modifications will also suggest themselves to those skilled in the art. It is intended in this patent to cover all such modifications that fall within the scope of the invention as defined by the appended claims.

I claim:—

1. Dump car construction comprising dump doors, a chain for moving said doors to closing position, a second chain for causing sudden release of said doors under load, operating shaft means for said chains, said chains being so disposed upon said operating shaft means that said releasing chain will be unwound and rewound during the unwinding operation of said closing chain and, lost motion connecting means between said shaft means and said closing chain.

2. Dump car construction comprising dump doors, a chain for closing said doors, a chain for causing the sudden release of said doors under load, an operating shaft for said chains, said chains being so disposed upon said shaft that said releasing chain is unwound and rewound during a single unwinding movement of said closing chain and lost motion connecting means between said closing chain and said shaft.

3. Dump car construction comprising hopper doors, a pair of links each having one end connected to a hopper door and having their other ends connected together, said links being located, when said doors are in closed position, in a position such that load upon said doors exerts stresses through said links to hold said doors closed, a chain for operating said links to move same to a position in which load upon said doors will urge said links to door opening position, a chain for moving said doors to closed position, said chains being so disposed that said releasing chain is wound and unwound during a single unwinding movement of said closing chain, a shaft for operating said closing chain, said shaft being provided with lost motion means for connecting said shaft to said closing chain.

4. Dump car construction comprising dump doors, controlling means for said dump doors, including a chain for moving same to closed position and a chain for causing sudden release of said doors, an operating shaft for said chains, said chains being so disposed upon said shaft that said releasing chain is wound and unwound during a single unwinding movement of said closing chain, said shaft being adapted in one direction of rotation to close said doors and in another direction of rotation to open said doors, said shaft being connected with said closing chain by means of a lost motion device whereby a violent tug upon said closing chain in the opening movement of said doors will not be communicated to said shaft.

5. Operating means for a hopper dump car comprising a chain for closing the hoppers thereof and a second chain for causing the sudden dumping of said hoppers under load, a rotatable shaft for winding and unwinding said chains, said chains being so disposed that said dumping chain will be unwound and rewound during a single unwinding movement of said closing chain, said shaft having an operating member fixed thereto, said closing chain having fixed thereto a collar mounted upon said shaft, said operating member and collar having co-operating lugs permitting a relatively great amount of lost motion therebetween.

6. Dump car construction comprising dump doors, link means pivotally connected to each of said dump doors and adapted in one position to cooperate to communicate forces to hold said dump doors closed, a chain for moving said link means to a position in which said link means no longer cooperate to hold said dump doors closed, another chain for moving said doors to closed position and adapted to be unwound in the opening movement of said doors, a shaft for operating said chains, said chains being so disposed upon said shaft that said first-mentioned chain will be unwound and rewound during a single unwinding movement of said other chain, and a lost motion device for connecting said shaft and said other chain.

7. Dump car construction comprising dump doors, link means pivotally connected to each of said dump doors and adapted in one position to cooperate to communicate forces to hold said dump doors closed, a chain for moving said link means to a position in which said link means no longer cooperate to hold said dump doors closed, another chain for moving said doors to closed position and adapted to be unwound in the opening movement of said doors, a shaft for operating said chains, said chains being so disposed upon said shaft that said first-mentioned chain will be unwound and rewound during a single unwinding movement of said other chain, said shaft being provided with a fixed abutment adapted in one direction of rotation to wind up said other chain but permitting lost motion of said chain relative thereto.

8. Dump car construction comprising dump doors, link means pivotally connected to each of said dump doors and adapted in one position to cooperate to communicate forces to hold said dump doors closed, a chain for moving said link means to a position in which said link means no longer cooperate to hold said dump doors closed, another chain for moving said doors to closed position and adapted to be unwound in the opening movement of said doors, a shaft for operating said chains, said chains being so disposed upon said shaft that said first-mentioned chain will be unwound and rewound during a single unwinding movement of said other chain, said shaft being provided with lug means secured thereto, said chain having secured thereto a collar mounted upon said shaft, said collar being provided with lug means adapted to cooperate with said first-mentioned lug means, said lug means providing a relatively large amount of lost motion therebetween.

9. Dump car construction comprising a dump door and pivotal means for controlling the closing of said door, said pivotal means comprising a pivot pin, said door and said pivot pin being provided with angular interfitting portions extending longitudinally and eccentrically of said pivot pin, said interfitting portions having polygonal contour of equal sides and angles to permit adjustment between said door and said pivot pin.

10. Dump car construction comprising a dump door and pivotal means for controlling the closing of said door, said pivotal means comprising a pivot pin having a hole extending longitudinally and eccentrically thereof, said door being provided with a member adapted to fit within said hole.

11. Dump car construction comprising a dump door and pivotal means for controlling the closing of said door, said pivotal means comprising a pivot pin having a hole extending longitudinally and eccentrically thereof, said door being provided with a member adapted to fit within said hole, said hole and member having an angular contour.

12. Dump car construction comprising a pair of dump doors, link means for controlling the opening and closing of said dump doors, said link means being pivotally connected to said dump doors, one of said link means being provided with an eccentrically mounted pivot pin for adjusting the operation of said doors.

Signed at Chicago, Illinois, this 18th day of August, 1922.

WILLIAM E. MOREY.